(12) United States Patent
Nakazono et al.

(10) Patent No.: US 7,900,021 B2
(45) Date of Patent: Mar. 1, 2011

(54) IMAGE PROCESSING APPARATUS AND IMAGE PROCESSING METHOD

(75) Inventors: Keisuke Nakazono, Hino (JP); Akira Ueno, Akiruno (JP); Motoo Azuma, Tokorozawa (JP)

(73) Assignee: Olympus Corporation, Tokyo (JP)

( * ) Notice: Subject to any disclaimer, the term of this patent is extended or adjusted under 35 U.S.C. 154(b) by 1128 days.

(21) Appl. No.: 10/930,355

(22) Filed: Aug. 30, 2004

(65) Prior Publication Data
US 2005/0099510 A1 May 12, 2005

(30) Foreign Application Priority Data
Sep. 4, 2003 (JP) .............................. 2003-312100

(51) Int. Cl.
G06F 15/00 (2006.01)
G06F 15/76 (2006.01)

(52) U.S. Cl. ........................................ 712/34; 345/588

(58) Field of Classification Search ............ 348/231.99; 712/34
See application file for complete search history.

(56) References Cited

U.S. PATENT DOCUMENTS 5,371,860 A * 12/1994 Mura et al. .................... 710/22
5,699,460 A * 12/1997 Kopet et al. .................. 382/307
5,961,631 A * 10/1999 Devereux et al. ........... 712/207

FOREIGN PATENT DOCUMENTS

JP 2000-312327 11/2000

* cited by examiner

*Primary Examiner* — Eddie P Chan
*Assistant Examiner* — Corey Faherty
(74) *Attorney, Agent, or Firm* — Straub & Pokotylo; John C. Pokotylo

(57) ABSTRACT

An image processing apparatus for storing taken image data into a memory and for reading the stored image data to effect image processing thereof, including: a storage section for storing sequence codes that indicate processing procedures of a series of image processing for the image data; an image processing section for effecting the series of image processing on the read out image data; and a sequencer for controlling the image processing section based on the sequence codes read out from the storage section in effecting the series of image processing at the image processing section, wherein the sequence codes are composed of data coding all sequence instructions corresponding to the series of image processing and are tranferred and stored collectively from CPU to the storage section before starting the series of image processing every time when the series of image processing is to be effected.

17 Claims, 7 Drawing Sheets

IMAGE PROCESSING APPARATUS AND IMAGE PROCESSING METHOD

This application claims benefit of Japanese Patent Application No.2003-312100 filed in Japan on Sep. 4, 2003, the contents of which are incorporated by this reference.

BACKGROUND OF THE INVENTION

The present invention relates to image processing apparatus and image processing methods for use in an electronic imaging apparatus such as digital camera.

General procedures of image processing in an electronic imaging apparatus such as digital camera using a solid-state imaging device for example of CCD will be summarized below by way of the block diagram of a digital camera shown in FIG. 1. First, imaging signals outputted from CCD imaging device 101 are treated with pre-process processing at a pre-process section 103 and then once stored as image data in SDRAM 104. Subsequently, the image data are read out from SDRAM 104 and sequentially subjected to a plurality of image processing at an image processing section 105 and are stored again into SDRAM 104. Finally, the image data after the image processing stored in SDRAM 104 are displayed on a display section 106 or further subjected for example to JPEG processing to be recorded on a recording medium such as a memory card 107. Denoted by a numeral 102 in FIG. 1 is CPU for controlling each section.

In achieving such processing procedure for image data, the image processing of one frame has conventionally been effected by first dividing the image data of one frame into a number of strips of small block image data (referred to as block line). A method is then used in which transferred data amount is reduced by sequentially processing each of the block lines so that the plurality of image processing can be effected through a small-capacity memory. Such image processing method has been disclosed for example in Japanese Patent Application Laid-Open 2000-312327.

A description will now be given by way of the timing chart of FIG. 2 with respect to operation of each section when image processing is sequentially executed by such division into the strips of small block images. First CPU 102 effects an initialization operation for setting parameters necessary for the image processing at the image processing section 105 to register of the image processing section 105. CPU 102 then cancels a reset of the image processing section 105 and gives DMA start instructions to an input DMA and output DMA of the image processing section 105. One block line is thereby read out from SDRAM 104 through the input DMA to the image processing section 105 and the image processing of the one block line is effected at the image processing section 105. The one block line after the image processing then is stored again into SDRAM 104 through the output DMA.

Upon termination of such processing, a DMA completion interrupt is sent to CPU 102. When CPU 102 is interrupted in this manner, CPU 102 acknowledges termination of the processing of the first block line, applies a reset on the image processing section 105, and sets the parameters for the next block line processing again to register of the image processing section 105. CPU 102 then cancels the reset on the image processing section 105 and gives DMA start instructions. The processing of one frame is thus effected by sequentially performing the procedures where the image processing of the next block line is similarly effected.

SUMMARY OF THE INVENTION

It is an object of the present invention to provide an image processing apparatus and image processing method in which processing time of CPU is greatly reduced and load on CPU is significantly lessened.

In a first aspect of the invention, there is provided an image processing apparatus for storing taken image data into a memory and for reading the stored image data to effect image processing thereof, including: a storage section for storing sequence codes that indicate processing procedures of a series of image processing for the image data; an image processing section for effecting the series of image processing on the read out image data; and a sequencer for controlling the image processing section based on the sequence codes read out from the storage section in effecting the series of image processing at the image processing section. The sequence codes are composed of data coding all sequence instructions corresponding to the series of image processing and are transferred and stored collectively from CPU to the storage section before starting the series of image processing every time when the series of image processing is to be effected.

In a second aspect of the invention, there is provided an image processing apparatus for storing taken image data and for reading the stored image data to effect image processing thereof, including: a storage section for storing the image data and sequence codes that indicate processing procedures of a series of image processing for the image data; an image processing section for effecting the series of image processing on the image data read out from the storage section; and a sequencer for controlling the image processing section based on the sequence codes read out from the storage section in effecting the series of image processing at the image processing section. The sequence codes are composed of data coding all sequence instructions corresponding to the series of image processing and are transferred and stored collectively from CPU to the storage section before starting the series of image processing every time when the series of image processing is to be effected.

In a third aspect of the invention, the image processing section in the image processing apparatus according to the first aspect includes a data input section which is switched to one or the other of an image data read mode for reading image data from the memory and a sequence code read mode for reading the sequence codes from the storage section based on a mode switching signal from the sequencer.

In a fourth aspect of the invention, the image processing section in the image processing apparatus according to the second aspect includes a data input section which is switched to one or the other of an image data read mode for reading image data from the storage section and a sequence code read mode for reading the sequence codes from the storage section based on a mode switching signal from the sequencer.

In a fifth aspect of the invention, the sequencer in the image processing apparatus according to the third or fourth aspect includes a control section receiving the sequence codes fetched with bringing the data input section into the sequence code read mode to effect code analysis thereof, for outputting control signals for controlling sequence at the image processing section based on result of the analysis.

In a sixth aspect of the invention, the control signals outputted from the control section in the image processing apparatus according to the fifth aspect are composed of reset signals for resetting the image processing section inclusive of the data input section, register setting signals for setting a register at the image processing section inclusive of the data input section, and data input start signals for giving an instruction to start data input to the data input section.

In a seventh aspect of the invention, the image processing section in the image processing apparatus according to the sixth aspect outputs to CPU or to the control section DMA completion interrupt signals for indicating completion of image processing when each image processing is terminated.

In an eighth aspect of the invention, the sequencer in the image processing apparatus according to the seventh aspect further includes a selector capable of selection between control signal from the sequencer and control signal from CPU, the selector being selectively controlled by select signal from CPU.

In a ninth aspect of the invention, the control section of the sequencer in the image processing apparatus according to the eighth aspect transfers sequence codes corresponding to each image processing from the storage section to the data input section in the state of applying a reset on the image processing section inclusive of the data input section by a reset signal immediately before each image processing.

In a tenth aspect of the invention, the sequence codes in the image processing apparatus according to the ninth aspect are composed of at least three instructions that are an interrupt wait instruction for instructing start of each image processing and enabling receipt of a termination interrupt of each image processing, a register setting instruction for setting a register of the image processing section, and a frame completion instruction for indicating termination of all of the image processing.

In an eleventh aspect of the invention, the storage section in the image processing apparatus according to the first aspect is an internal memory.

In a twelfth aspect of the invention, the storage section in the image processing apparatus according to the first aspect is an external memory.

In a thirteenth aspect of the invention, the storage section, image processing section and sequencer in the image processing apparatus according to the first or eleventh aspect are formed on the same one semiconductor substrate.

In a fourteenth aspect of the invention, the image processing section and sequencer in the image processing apparatus according to the first or twelfth aspect are formed on the same one semiconductor substrate.

In a fifteenth aspect of the invention, the storage section in the image processing apparatus according to the second aspect is an internal memory.

In a sixteenth aspect of the invention, the storage section in the image processing apparatus according to the second aspect is an external memory.

In a seventeenth aspect of the invention, the storage section, image processing section and sequencer in the image processing apparatus according to the second or fifteenth aspect are formed on the same one semiconductor substrate.

In an eighteenth aspect of the invention, the image processing section and sequencer in the image processing apparatus according to the second or sixteenth aspect are formed on the same one semiconductor substrate.

In a nineteenth aspect of the invention, there is provided an image processing method dividing image data into a plurality of blocks, for sequentially effecting image processing of a plurality of block lines obtained by combining the plurality of blocks correspondingly to a frame line length, including: a first step of collectively transferring and storing from CPU to a storage section all sequence codes that indicate processing procedures for sequentially effecting image processing of each block line before starting the image processing; a second step of reading the sequence codes from the storage section to effect code analysis by a sequencer at start of image processing and, if result of the analysis corresponds to the image processing of the block line, starting the processing of the block line after setting a register of an image processing section; a third step of repeating the second step for all block lines; a fourth step of outputting by the sequencer of a frame completion interrupt signal to CPU when read out sequence code is a frame completion instruction for indicating termination of the processing of all block lines; and a fifth step of effecting frame termination processing by CPU when frame completion interrupt signal is inputted into the CPU.

DESCRIPTION OF THE PREFERRED EMBODIMENT

Figure 1:
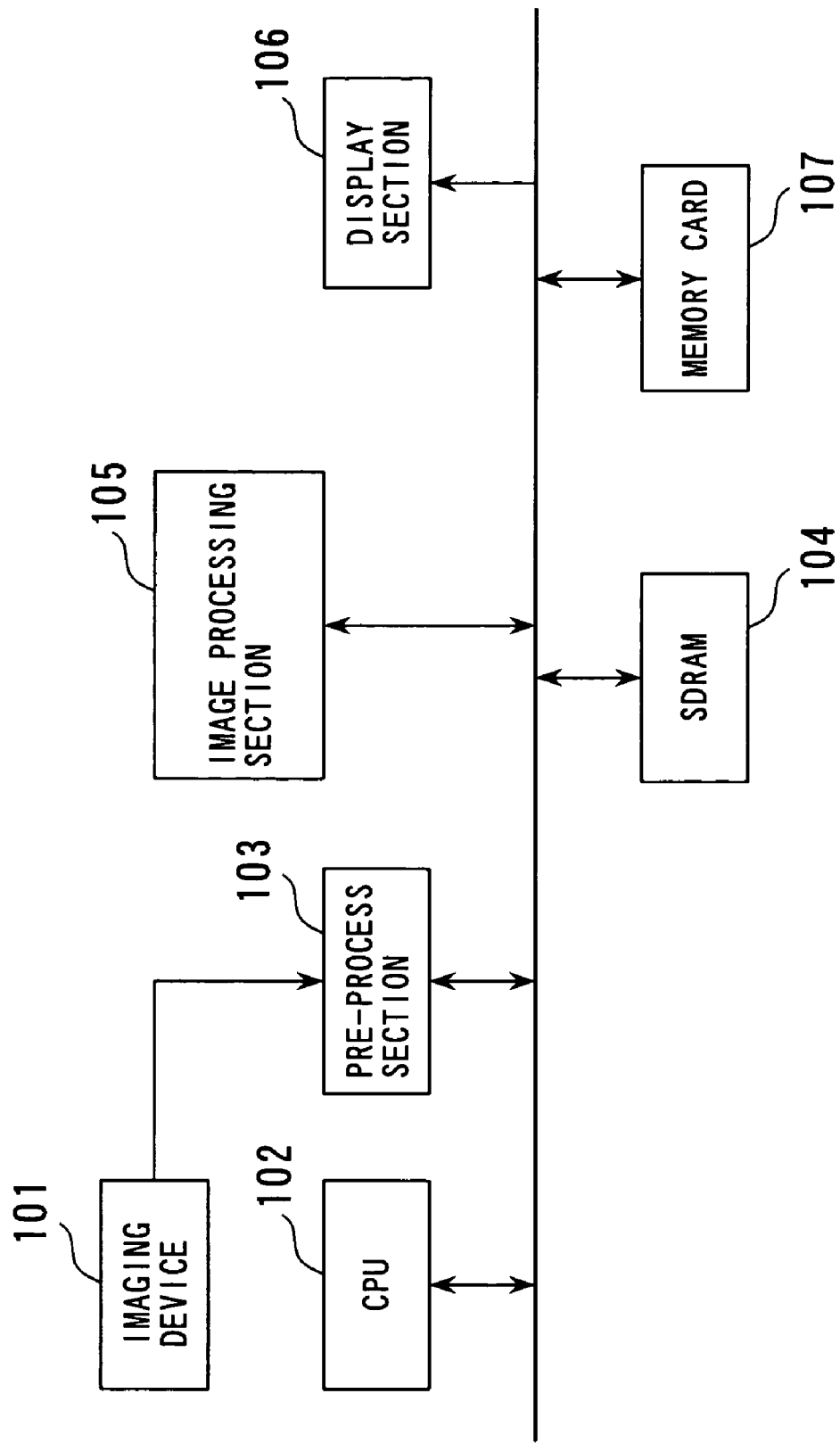
FIG. 1 is a block diagram showing an example of construction of the conventional image processing apparatus.
Figure 2:
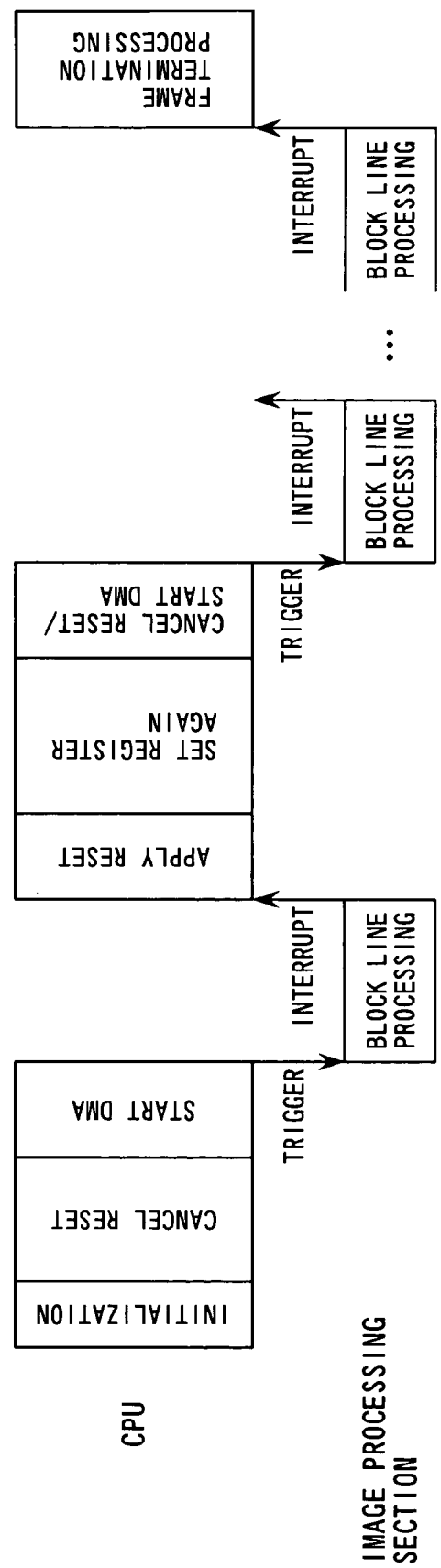
FIG. 2 is a timing chart for explaining operation of each section of the conventional example shown in FIG. 1.
Figure 3:
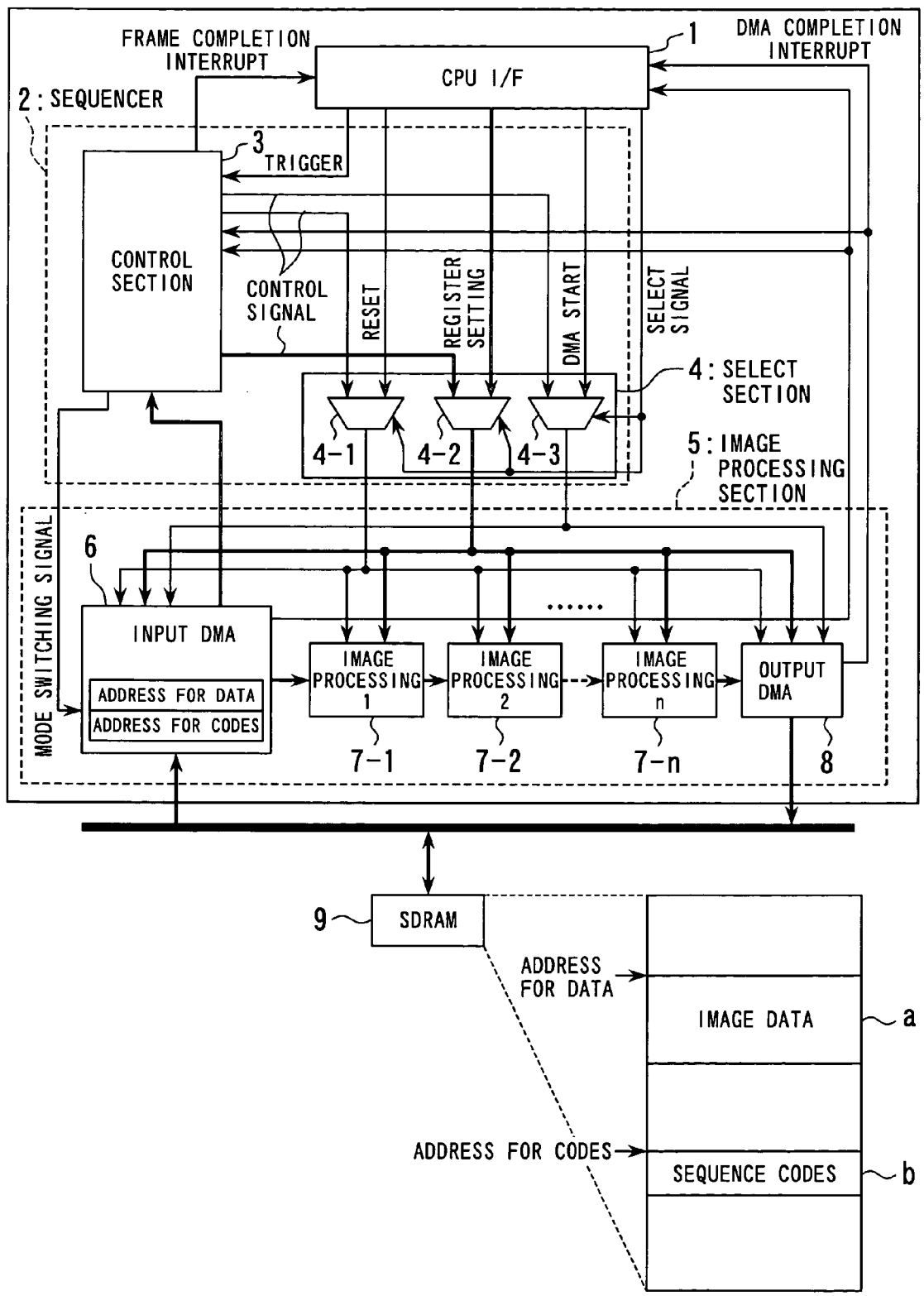
FIG. 3 is a block diagram showing an embodiment of the image processing apparatus according to the invention.

An embodiment of the invention will now be described. FIG. 3 is a block diagram showing an embodiment of the image processing apparatus according to the invention. FIG. 3 includes: 1, CPU I/F connected to CPU (not shown); and 2, a sequencer including a control section 3 and a select section 4 which has three selectors, i.e., a reset signal selector 4-1, a register setting signal selector 4-2, and DMA start signal selector 4-3. Numeral 5 denotes an image processing section which includes an input DMA 6, a plurality of image processing blocks 7-1, 7-2, . . . 7-n, and an output DMA 8. Numeral 9 denotes SDRAM having for example an image data storing region "a" and sequence code storing region "b".

Figure 4:
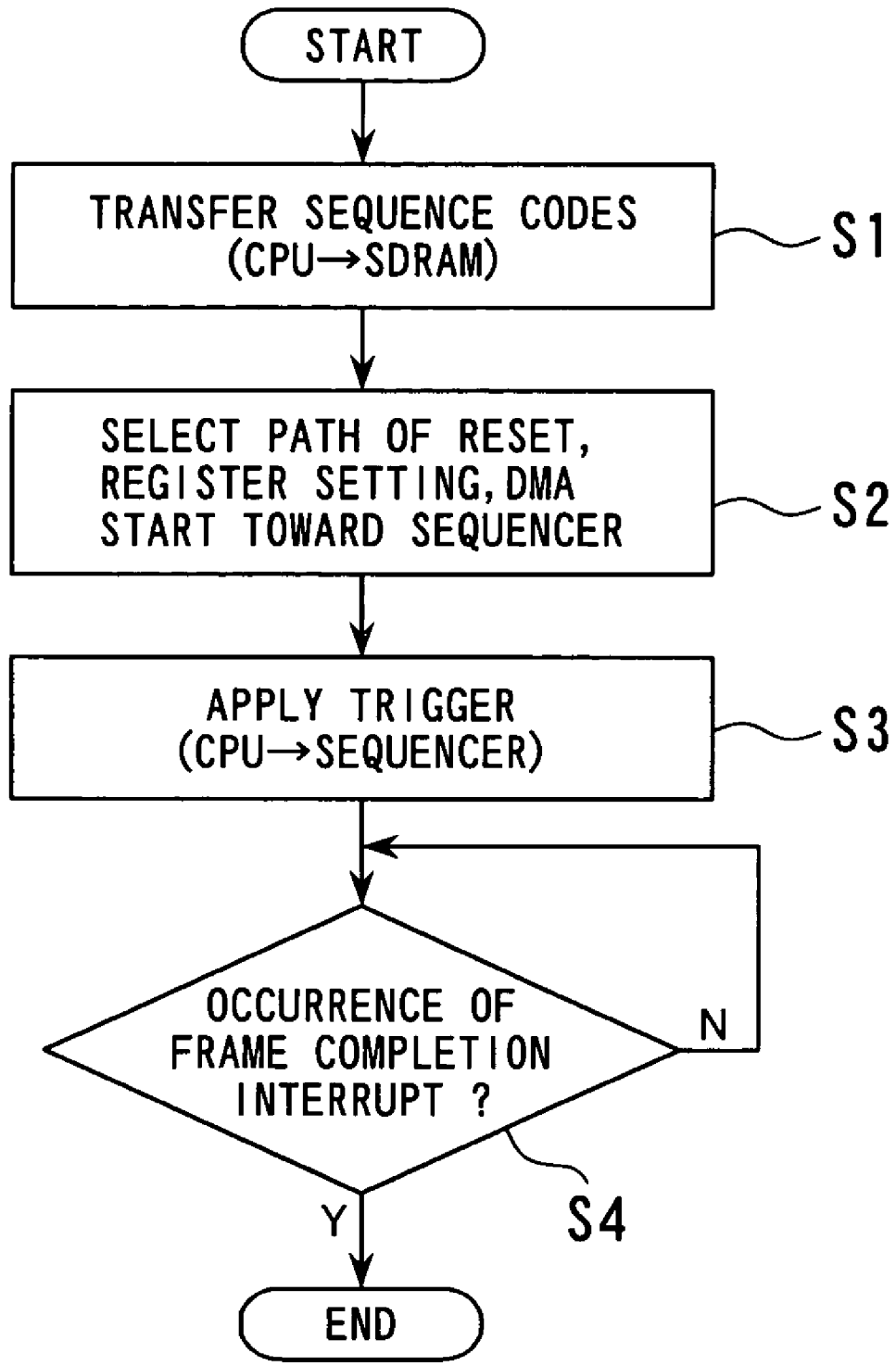
FIG. 4 is a flowchart for explaining the processing operation of CPU in the embodiment shown in FIG. 3.
Figure 5:
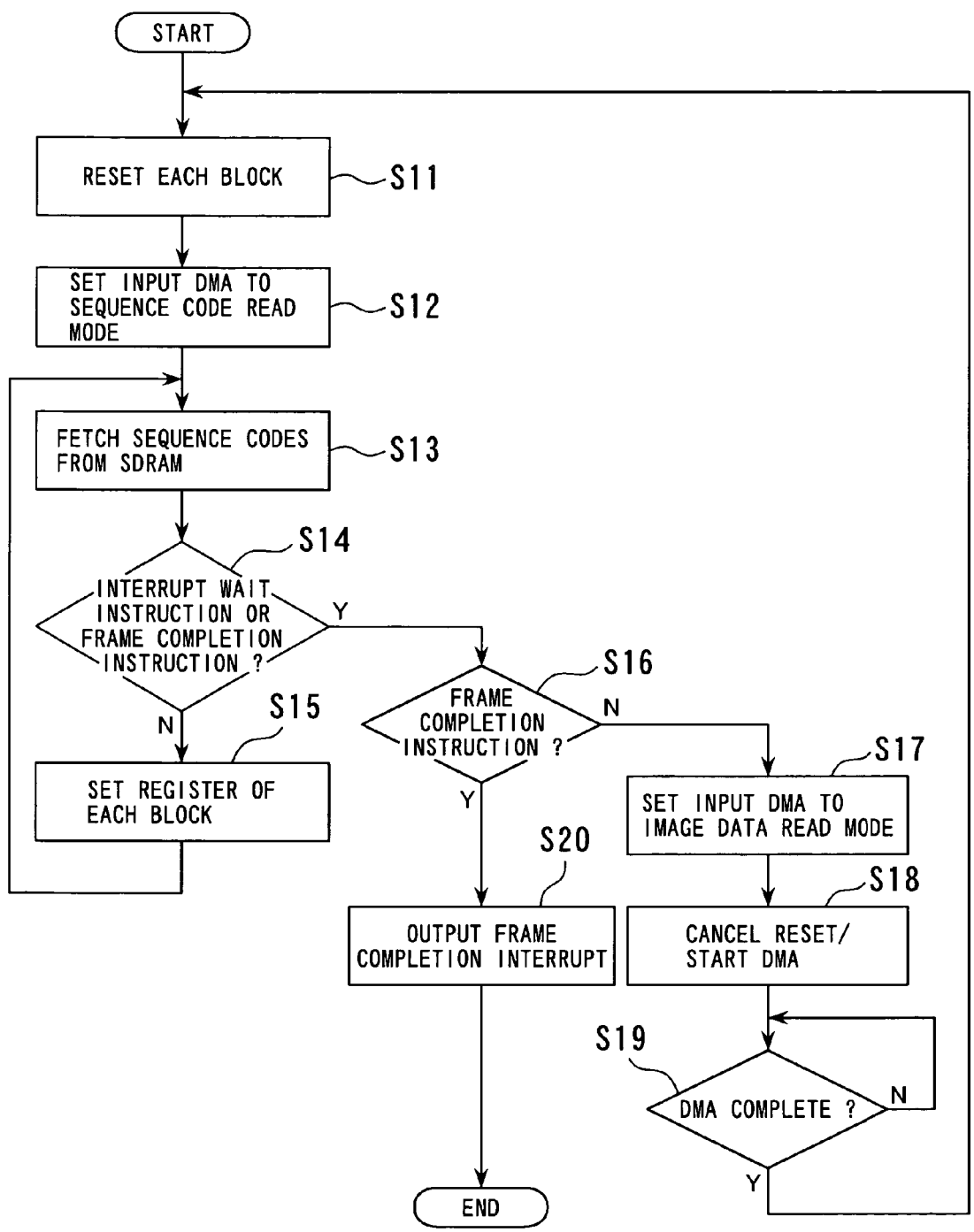
FIG. 5 is a flowchart for explaining the processing operation of sequencer in the embodiment shown in FIG. 3.
Figure 6:
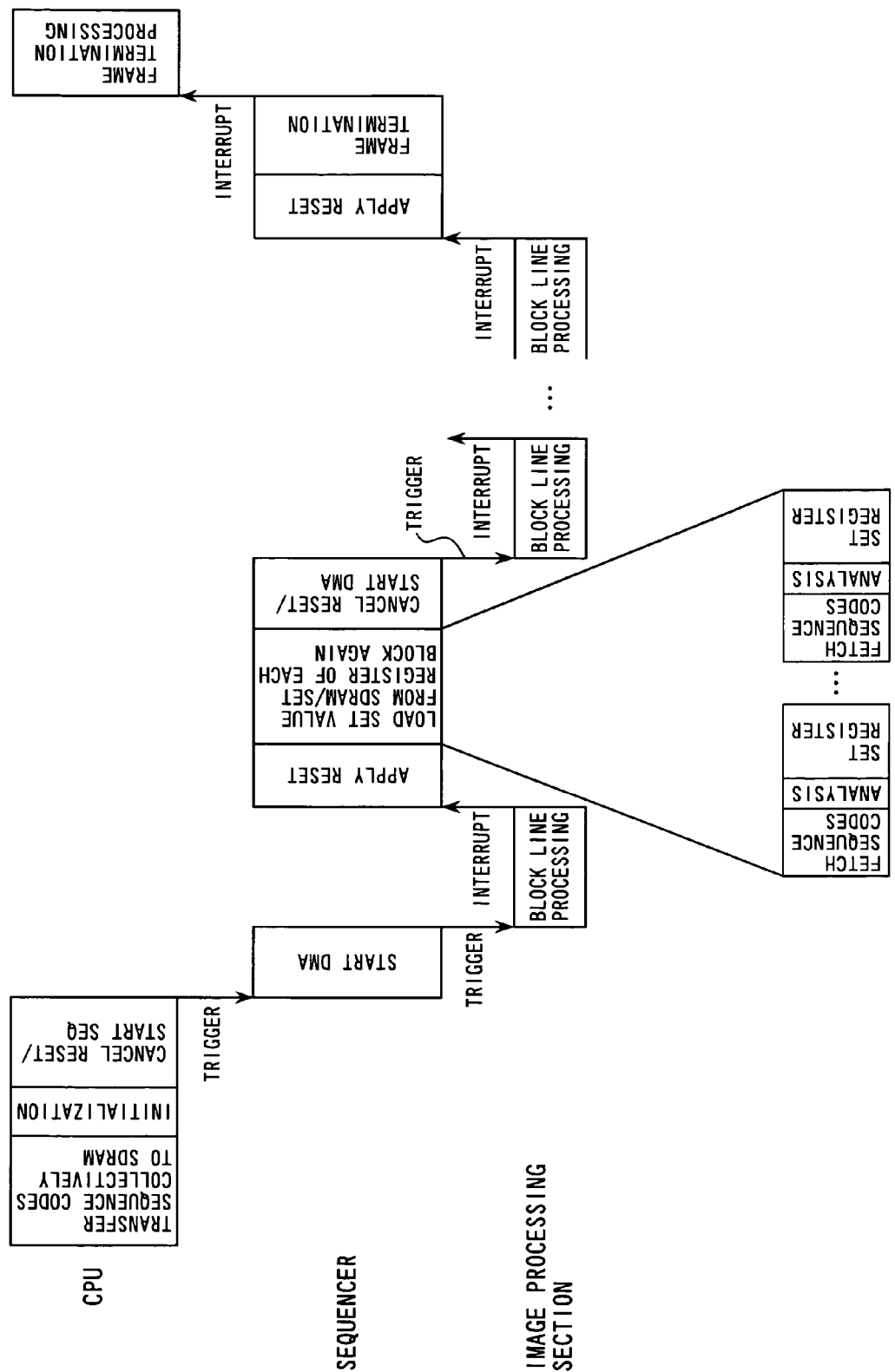
FIG. 6 is a timing chart for explaining operation of each section in the embodiment shown in FIG. 3.

An operation of the image processing apparatus having such construction will now be described with reference to the flowchart of processing at CPU shown in FIG. 4, the flowchart of processing of the sequencer shown in FIG. 5, and the timing chart shown in FIG. 6. First, CPU causes sequence codes corresponding to one frame indicating all processing procedures that can be analyzed by the sequencer 2 to be previously transferred and written collectively into SDRAM 9 through CPU I/F 1 (step S1). CPU then initializes the image processing section 5 through each selector 4-1, 4-2, 4-3 that are being switched toward CPU and sets parameters necessary for the processing of a first block line of image data to register. The reset signal selector 4-1, register setting signal selector 4-2, DMA start signal selector 4-3 are then respectively switched toward the sequencer 2 by a select signal from CPU (step S2). Next the reset is canceled and the sequencer 2 is started by a trigger from CPU (step S3).

When sequencer 2 is started and the operation is switched to the sequencer 2, each image processing block 7-1, 7-2, . . . 7-n is reset by a control signal form the control section 3 of the sequencer 2 (step S11), and the input DMA 6 of the image processing section 5 is set to a sequence code read mode by a mode switching signal from the control section 3 (step S12). The sequence codes are then fetched from SDRAM 9 through the input DMA 6 (step S13).

Figure 7:
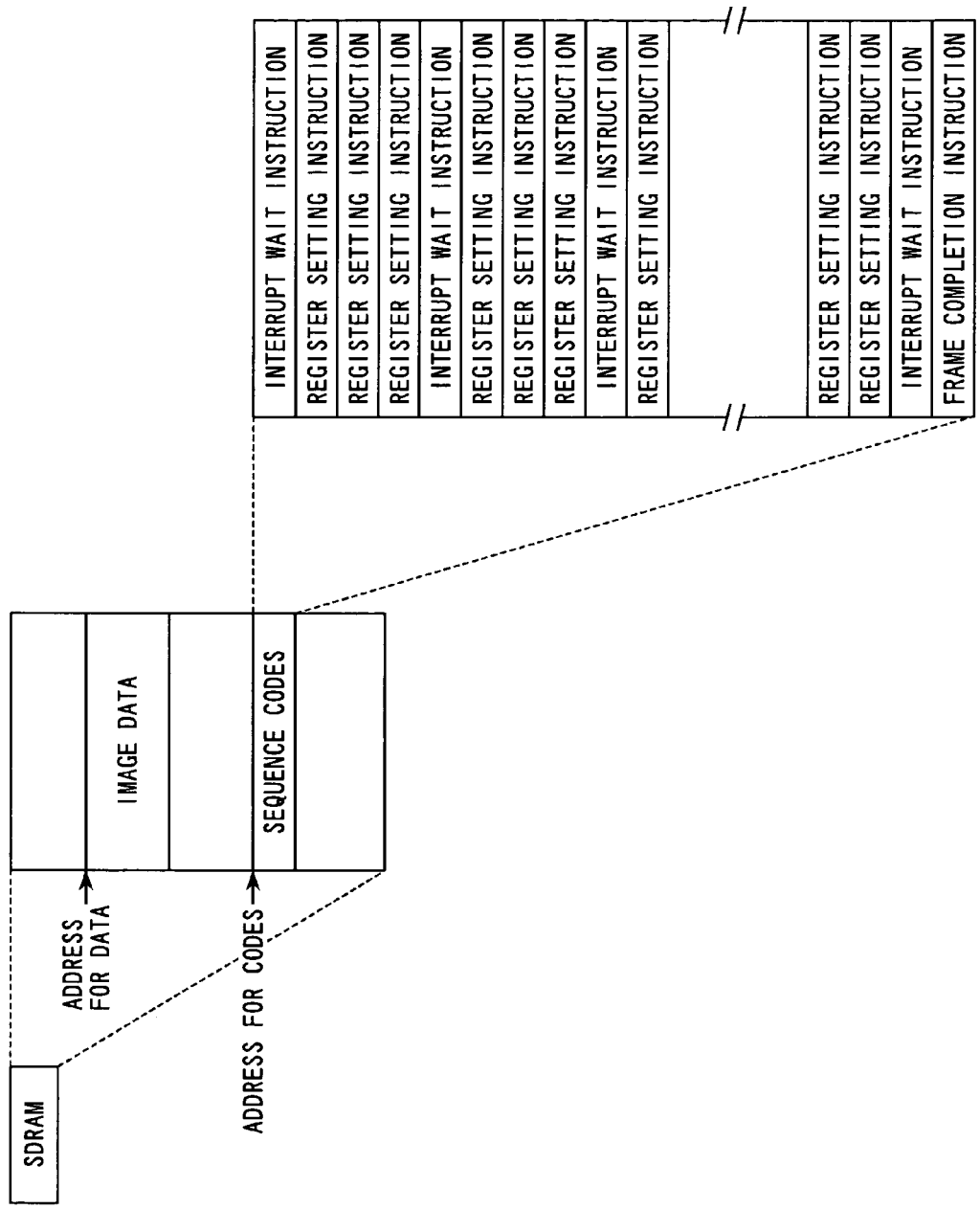
FIG. 7 is an example of content of the sequence codes stored in SDRAM in the embodiment shown in FIG. 3.

The sequence codes, as shown in FIG. 7, in the main includes three types of instruction codes that are interrupt wait instructions, register setting instructions, and frame completion instructions. When an interrupt wait instruction is taken into the control section 3 of the sequencer 2, control signals are inputted to the input DMA 6 and output DMA 8 from the control section 3 through the DMA start signal selector 4-3 so as to start operation of these. Since, however, the register setting for the first block line is directly set by CPU before starting the sequencer 2, the input DMA 6 at the time of the processing of the first block line is set to an image data read mode instead of the operation of the above described step S12 (step S17). After resetting each image processing block, then, the input DMA 6 and output DMA 8 are started (step S18). The image data of the block line are thereby read out from SDRAM 9, and various image processing is effected at each image processing block 7-1, 7-2, . . . 7-n. The image data after the image processing are stored again into SDRAM 9 through the output DMA 8.

In this state, the sequencer 2 waits for DMA completion interrupt signal (step S19). When the operation of the input DMA 6 and output DMA 8 is completed and completion interrupt signals therefrom are received at sequencer 2, the sequencer 2 repeats the operation from the beginning again and resets each image processing block 7-1, 7-2, . . . 7-n again by a control signal from the control section 3 thereof (step S11). The input DMA 6 is then set to a sequence code read mode (step S12), and the control section 3 fetches the next sequence codes from SDRAM 9 through the input DMA 6 (step S13). The control section 3 then analyzes the sequence code to determine if it is an interrupt wait instruction or a frame completion instruction (step S14), and, if neither is the case and it is a register setting instruction, the setting of register to each image processing block 7-1, 7-2, . . . 7-n is repeated through the register setting selector 4-2 (step S15).

When the setting of register of each image processing block is completed, the input DMA 6 is set to an image data read mode by an interrupt instruction of the next sequence code (steps S16, S17). After canceling the reset of each image processing block, then, the operation of the input DMA 6 and output DMA 8 is started (step S18). The image data of the next block line are thereby read out to the image processing blocks from SDRAM 9 through the input DMA 6, and after subjected to predetermined image processing, are stored again into SDRAM 9 through the output DMA 8. When the sequencer 2 receives DMA completion interrupt signal (step S19), then, the apparatus proceeds to the processing of the next block line again.

Thereafter, similar processing by control of the sequencer 2 is continued and, when the image processing of image data corresponding to one frame is terminated and the sequencer 2 takes in a frame completion instruction code (step S16), a frame completion interrupt signal is outputted to CPU from the control section 3 (steps S4, S20), to terminate the operation of CPU and sequencer 2.

In this manner, according to the present embodiment, sequence codes for indicating all processing procedures of the image processing corresponding to one frame that can be analyzed by the sequencer 2 are previously transferred from CPU to SDRAM 9, and the sequence codes are fetched from SDRAM 9 by the sequencer 2. Since the image processing section 5 is thus controlled based on such sequence codes so that sequential execution of the image processing corresponding to one block line be repeated, the processing time of CPU can be greatly reduced and load on CPU be significantly lessened.

Further, the operation sequence of the image processing section 5 can be changed at will simply by changing the sequence codes to be stored into SDRAM 9 from CPU.

While the above embodiment has been shown as that in which the setting of register is effected directly from CPU at the time of processing of the image data of the first block line, it is possible also at the processing of the image data of the first block line to effect the setting of register of each image processing block in accordance with the sequence codes fetched by the sequencer similarly to the processing of the image data of and after the second block line.

Further, while the sequence codes in the above embodiment are stored together with image data into SDRAM which is an external memory, the sequence codes may also be stored into an internal memory such as SRAM separately from the image data. Furthermore, it is also possible to store both the image data and the sequence codes into an internal memory.

In the case where the sequence codes are stored together with image data into SDRAM that is an external memory in the image processing apparatus according to the present embodiment, the image processing section and sequencer can be formed on the same one semiconductor substrate. Further, in the case where the sequence codes are stored into an internal memory, the image processing section and sequencer including such internal memory can be formed on the same one semiconductor substrate. Furthermore, when the image data and sequence codes are stored into an internal memory, the image processing section and sequencer including such internal memory can also be formed on the same one semiconductor substrate.

What is claimed is:

1. An image processing apparatus for storing taken image data and for reading the stored image data sequentially, block image data by block image data, each block image data including image data of a plurality of lines to sequentially effect image processing on each of the read out block image data, said image processing apparatus comprising:

a storage means for storing said image data corresponding to one frame and storing sequence codes that indicate processing procedures of a series of image processing for the image data corresponding to one frame;

an image processing section for effecting said series of image processing on each block image data read out from said storage means; and a sequencer for controlling an operation sequence of said image processing section so as to effect, in repetition, said series of image processing on each said block image data based on the sequence codes read out from said storage means;

wherein said sequence codes comprise data coding all sequence instructions corresponding to said series of image processing on the image data corresponding to one frame and are transferred collectively from a CPU to said storage means, said storage means being configured to store said sequence codes in order of execution before starting the series of image processing on said image data, and wherein the CPU, after the collective transferring of the sequence codes to the storage means, causes the sequencer to be started with effecting an initial setting of the image processing section and a register setting of the parameters necessary for the processing of a first block image data of the image data.

2. The image processing apparatus according to claim 1, wherein said image processing section comprises a data input section switched to one or the other of an image data read mode for reading image data from said storage means and a sequence code read mode for reading the sequence codes from said storage means based on a mode switching signal from said sequencer.

3. The image processing apparatus according to claim 2, wherein said sequencer comprises a control section for receiving the sequence codes read from said data input section in the sequence code read mode to effect code analysis thereof and for outputting control signals for controlling sequence at said image processing section based on result of the analysis.

4. The image processing apparatus according to claim 3, wherein the control signals outputted from said control section comprise reset signals for resetting the image processing section inclusive of said data input section, register setting signals for setting a register at the image processing section inclusive of said data input section, and data input start signals for giving an instruction to start data input to said data input section.

5. The image processing apparatus according to claim 4, wherein said image processing section outputs to said CPU or to said control section DMA completion interrupt signals for indicating completion of image processing when each image processing is terminated.

6. The image processing apparatus according to claim 5, wherein said sequencer further comprises a selector capable of selection between control signal from the sequencer and control signal from said CPU, the selector being selectively controlled by select signal from said CPU.

7. The image processing apparatus according to claim 6, wherein the control section of said sequencer transfers sequence codes corresponding to said series of image processing from said storage means to said data input section after resetting the image processing section inclusive of said data input section by a reset signal immediately before said series of image processing.

8. The image processing apparatus according to claim 7, wherein said sequence codes comprise at least three instructions that are an interrupt wait instruction for instructing start of each image processing and enabling receipt of a termination interrupt of each image processing, a register setting instruction for setting a register of said image processing section, and a frame completion instruction for indicating termination of all image processing.

9. The image processing apparatus according to claim 1, wherein said storage means comprises an external memory.

10. The image processing apparatus according to claim 1, wherein said image processing section and sequencer are formed on the same one semiconductor substrate.

11. The image processing apparatus according to claim 9, wherein said image processing section and sequencer are formed on the same one semiconductor substrate.

12. An image processing method for reading image data of one frame stored in a single storage section sequentially, block image data by block image data, each block image data including image data of a plurality of lines and for sequentially effecting image processing of each of the read out block image data, said image processing method comprising:
a first step of collectively transferring and storing, from a CPU to said single storage section, sequence codes for image data corresponding to one frame that indicate processing procedures for sequentially effecting image processing of each said block image data before starting said image processing;
a second step of starting, with the CPU, a sequencer with effecting an initial setting of the image processing section and a register setting of the parameters necessary for the processing of a first block image data of the image data;
a third step of reading the sequence codes from said single storage section by said sequencer at start of image processing and, if the read out sequence code is the sequence code for image processing of the block image data, starting the processing of the block image data after causing a register of said image processing section to retain said sequence codes;
a fourth step of repeating the second step for all block image data;
a fifth step of outputting from said sequencer a frame completion interrupt signal indicating that the processing of image data of said one frame has been completed to said CPU when the read out sequence code is a frame completion instruction for indicating termination of the processing of all block image data; and
a sixth step of effecting frame termination processing by said CPU when said frame completion interrupt signal is inputted into said CPU.

13. The image processing apparatus according to claim 1, wherein the image data corresponding to one frame and said sequence codes indicating processing procedures for the image data are stored together in a unitary storage section.

14. The image processing apparatus according to claim 1, wherein the image data corresponding to one frame is stored in a first storage section and said sequence codes indicating processing procedures for the image data is stored separately in a second storage section distinct from said first storage section.

15. The image processing apparatus according to claim 1, wherein said image processing section includes a plurality of serially connected image processing sections configured to process the image data in series.

16. The image processing apparatus of claim 1 wherein the storage means is a single SDRAM.

17. The image processing apparatus of claim 1 wherein the storage means is a single memory having an image data storing region starting at a first address and a sequence code storing region starting at a second address.

* * * * *